United States Patent
Berry et al.

(10) Patent No.: US 11,194,110 B2
(45) Date of Patent: Dec. 7, 2021

(54) CABLE SUPPORT DEVICES AND ASSEMBLIES

(71) Applicant: AFL Telecommunications LLC, Duncan, SC (US)

(72) Inventors: Samuel Berry, Greenville, SC (US); Steven Kranz, Moore, SC (US)

(73) Assignee: AFL Telecommunications LLC, Duncan, SC (US)

( * ) Notice: Subject to any disclaimer, the term of this patent is extended or adjusted under 35 U.S.C. 154(b) by 0 days.

(21) Appl. No.: 16/686,891

(22) Filed: Nov. 18, 2019

(65) Prior Publication Data
US 2021/0149139 A1    May 20, 2021

(51) Int. Cl.
G02B 6/44    (2006.01)
F16L 3/23    (2006.01)

(52) U.S. Cl.
CPC .............. *G02B 6/4439* (2013.01); *F16L 3/23* (2013.01); *G02B 6/443* (2013.01)

(58) Field of Classification Search
None
See application file for complete search history.

(56) References Cited

U.S. PATENT DOCUMENTS

| | | | | |
|---|---|---|---|---|
| 4,423,853 A * | 1/1984 | Davis, Sr. | ................. | H02G 1/04 254/134.3 R |
| 5,599,005 A * | 2/1997 | Sauber | ..................... | H02G 1/04 254/134.3 PA |
| 6,164,609 A * | 12/2000 | Eslambolchi | ............ | H02G 7/02 248/218.4 |
| 6,215,937 B1 * | 4/2001 | Dinh | ...................... | G02B 6/483 385/134 |
| 6,315,269 B1 * | 11/2001 | Fleury | .................... | B66D 3/046 254/134.3 PA |
| 6,517,052 B1 * | 2/2003 | Lake | ........................ | H02G 1/06 254/134.3 PA |
| 6,540,207 B1 * | 4/2003 | Barnes | ...................... | H02G 1/04 254/134.3 PA |
| 7,874,543 B2 * | 1/2011 | Theisen | ................... | H02G 1/04 254/134.3 R |
| 8,991,790 B2 * | 3/2015 | Herman | ................... | H02G 1/02 254/134.3 R |
| 9,948,076 B1 * | 4/2018 | Davey | .................. | B65H 49/327 |
| 2002/0003939 A1 * | 1/2002 | Hermsen | ................ | G02B 6/483 385/135 |
| 2003/0150201 A1 * | 8/2003 | Matheson | ............... | B66C 13/14 57/10 |
| 2015/0086166 A1 * | 3/2015 | Coate | ....................... | G02B 6/25 385/95 |

(Continued)

*Primary Examiner* — Tina M Wong
(74) *Attorney, Agent, or Firm* — Dority & Manning, P.A.

(57) ABSTRACT

Cable support devices and assemblies are provided. A cable support device supports multiple fiber-optic cables on an above-ground pole. A cable support device includes a base, and a first arm and a second arm extending from the base, the first arm and second arm generally parallel to each other. The cable support device further includes a cross-member extending between and connected to the first arm and the second arm. The cable support device further includes at least one divider member extending radially outwardly from the cross-member, the at least one divider member spaced from the first arm and the second arm and defining at least two slots, each of the at least two slots further defined by the cross-member.

18 Claims, 6 Drawing Sheets

(56) References Cited

U.S. PATENT DOCUMENTS

2017/0229848 A1* 8/2017 Barnhill .................. H02G 1/04
2018/0031795 A1* 2/2018 Al Ghossein ........ G02B 6/4478
2019/0154944 A1* 5/2019 Chappell, II ........... G02B 6/483
2021/0149139 A1* 5/2021 Berry .................. G02B 6/4439

* cited by examiner

CABLE SUPPORT DEVICES AND ASSEMBLIES

FIELD

The present disclosure relates generally to fiber optic communications networks, and more particularly to cable support devices and assemblies for use in fiber optic communications networks.

BACKGROUND

Optical fiber is increasingly being used for a variety of applications, including broadband applications such as voice, video and data transmissions. As a result of this increasing demand, fiber optic networks typically include a large number of mid-span access locations at which one or more optical fibers are branched from a distribution cable. These mid-span access locations provide a branch point from the distribution cable and may lead to an end user, commonly referred to as a subscriber. Fiber optic networks which provide such access are commonly referred to as FTTX "fiber to the X" networks, with X indicating a delivery point such as a home (i.e. FTTH).

Drop cables are utilized to connect the end user to the distribution cable and thus the fiber optic network. For example, multi-port optical connection terminals have been developed for interconnecting drop cables with a fiber optic distribution cable at a predetermined branch point in a fiber optic network between a mid-span access location on the distribution cable and a delivery point such as a subscriber premises. Utilizing such terminals, drop cables extending from a delivery point may be physically connected to the communications network at the branch point provided by such terminals as opposed to at the actual mid-span access location provided on the distribution cable. Alternatively, however, drop cables may connect to the distribution cable at the mid-span access location.

Cables of the fiber optic network, such as stub cables and drop cables, may extend over relatively long distances, and typically are supported at various locations along these distances on poles such as power utility or telephone company owned poles. One current issue is that the power utility or telephone company that owns a pole requires payment (typically an annual lease payment) for each attachment to the pole to support such cable. Further, the minimum recommended distance between attachments is typically at least six inches. Currently known apparatus for supporting such cables in such a manner only support individual cables, thus making the attachment of multiple cables to a pole a relatively expensive venture that takes up a significant amount of pole real estate. An additional concern is the structural integrity of the poles. A high number of attachments can result in a decrease in the structural life of the pole, such that the pole needs to be replaced in a relatively shorter period of time. This replacement process can be time-consuming and expensive.

Accordingly, improved cable support devices and assemblies for fiber optic communications networks would be advantageous. In particular, improved cable support devices which are capable of supporting multiple cables in a fiber optic communications networks in a manner which minimizes the number of attachment points and required pole real estate would be desirable.

BRIEF DESCRIPTION

Aspects and advantages of the cable support devices and assemblies in accordance with the present disclosure will be set forth in part in the following description, or may be obvious from the description, or may be learned through practice of the technology.

In accordance with one embodiment, a cable support assembly for supporting multiple fiber-optic cables on an above-ground pole is provided. The cable support assembly includes a cable support device mountable on the above-ground pole. The cable support device includes a base, and a first arm and a second arm extending from the base, the first arm and second arm generally parallel to each other. The cable support device further includes a cross-member extending between and connected to the first arm and the second arm. The cable support device further includes at least one divider member extending radially outwardly from the cross-member, the at least one divider member spaced from the first arm and the second arm and defining at least two slots, each of the at least two slots further defined by the cross-member. The cable support assembly further includes a plurality of cable deadends, each of the plurality of deadends insertable into one of the at least two slots.

In accordance with another embodiment, a cable support device for supporting multiple fiber-optic cables on an above-ground pole is provided. The cable support device includes a base, and a first arm and a second arm extending from the base, the first arm and second arm generally parallel to each other. The cable support device further includes a cross-member extending between and connected to the first arm and the second arm. The cable support device further includes at least one divider member extending radially outwardly from the cross-member, the at least one divider member spaced from the first arm and the second arm and defining at least two slots, each of the at least two slots further defined by the cross-member.

These and other features, aspects and advantages of the present cable support devices and assemblies will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION

A full and enabling disclosure of the present cable support devices and assemblies, including the best mode of making and using the present systems and methods, directed to one of ordinary skill in the art, is set forth in the specification, which makes reference to the appended figures, in which.

DETAILED DESCRIPTION

Reference now will be made in detail to embodiments of the present cable support devices and assemblies, one or more examples of which are illustrated in the drawings. Each example is provided by way of explanation, rather than limitation of, the technology. In fact, it will be apparent to those skilled in the art that various modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents.

The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components.

As used herein, the terms "upstream" (or "forward") and "downstream" (or "aft") refer to the relative direction with respect to fluid flow in a fluid pathway. For example, "upstream" refers to the direction from which the fluid flows, and "downstream" refers to the direction to which the fluid flows. The term "radially" refers to the relative direction that is substantially perpendicular to an axial centerline of a particular component, the term "axially" refers to the relative direction that is substantially parallel and/or coaxially aligned to an axial centerline of a particular component and the term "circumferentially" refers to the relative direction that extends around the axial centerline of a particular component. Terms of approximation, such as "generally," or "about" include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise.

Figure 1:
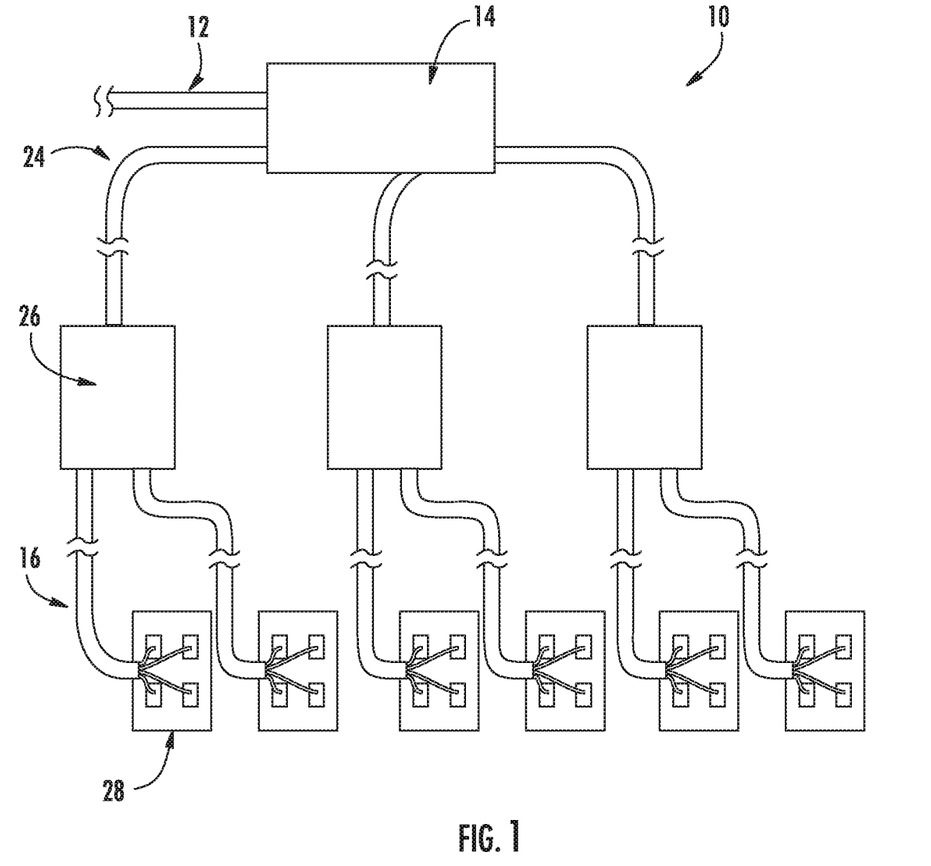
FIG. 1 is a schematic illustration of a known fiber optic communications network.

Referring now to FIG. 1, a portion of a known fiber optic communications network 10 which includes a fiber optic distribution cable 12 is shown. One or more mid-span access locations are provided along the length of the distribution cable 12. The mid-span access location may be enclosed and protected from exposure to the environment by a conventional closure 14. The fiber optic communications network 10 may include a fiber optic distribution cable 12 having a plurality of mid-span access locations at branch points spaced along the length of the distribution cable, each providing access to at least one, and preferably, a plurality of optical fibers of the fiber optic network. Thus, in the embodiments shown, the distribution cable 12 may provide multiple locations for joining stub cables 24 of multi-port optical connection terminals 26 to the distribution cable 12 at each mid-span access location.

In the fiber optic network 10 as illustrated, pre-terminated optical fibers of the distribution cable 12 provided at the mid-span access location are routed out of the distribution cable and spliced to respective optical fibers of a stub cable 24 extending from a multi-port optical connection terminal 26. The optical fibers of the stub cable 24 may enter the closure 14 through a suitable cable port provided through an exterior wall, for example an end wall, of the closure 14. The stub cable 24 includes at least one, and preferably a plurality of optical fibers disposed within a protective cable sheath. The stub cable 24 may, for example, be any known fiber optic cable which includes at least one optical fiber and having a fiber count equal to or greater than that of a drop cable 16 to be connected to the multi-port optical connection terminal 26 and equal to or less than that of the distribution cable 12.

The stub cable 24 may extend from the closure 14 into a terminal 26. The optical fibers of the stub cable 24 within the terminal 26 may be connectorized. One or more connectorized drop cables 16 may be interconnected with the connectorized optical fibers of the stub cable 24, i.e. in terminal 26. The drop cables 16 may include at least one single mode or multimode optical fiber of any type optically connected to a single fiber or multi-fiber optical connector in a conventional manner. The other ends of the drop cables 16 are optically connected to respective optical fibers of the communications network within an outside plant connection terminal 28 at a delivery point, such as an outside plant network access point (NAP) closure, local convergence cabinet (LCC), terminal, pedestal or network interface device (NID). As shown, one or more stub cables 24 extends from the closure 14 to a terminal 26 positioned at a distance from the mid-span access location, such as a telephone pole, hand-hole, vault or pedestal (not shown) in the fiber optic network 10. Each drop cable 16 extends from a terminal 26 to an outside plant connection terminal 28 located at a delivery point such as a subscriber home.

It should be understood that the present disclosure is not limited to the above-described embodiment of a fiber optic network 10, and rather that any suitable fiber optic network 10 is within the scope and spirit of the present disclosure.

Figure 7:
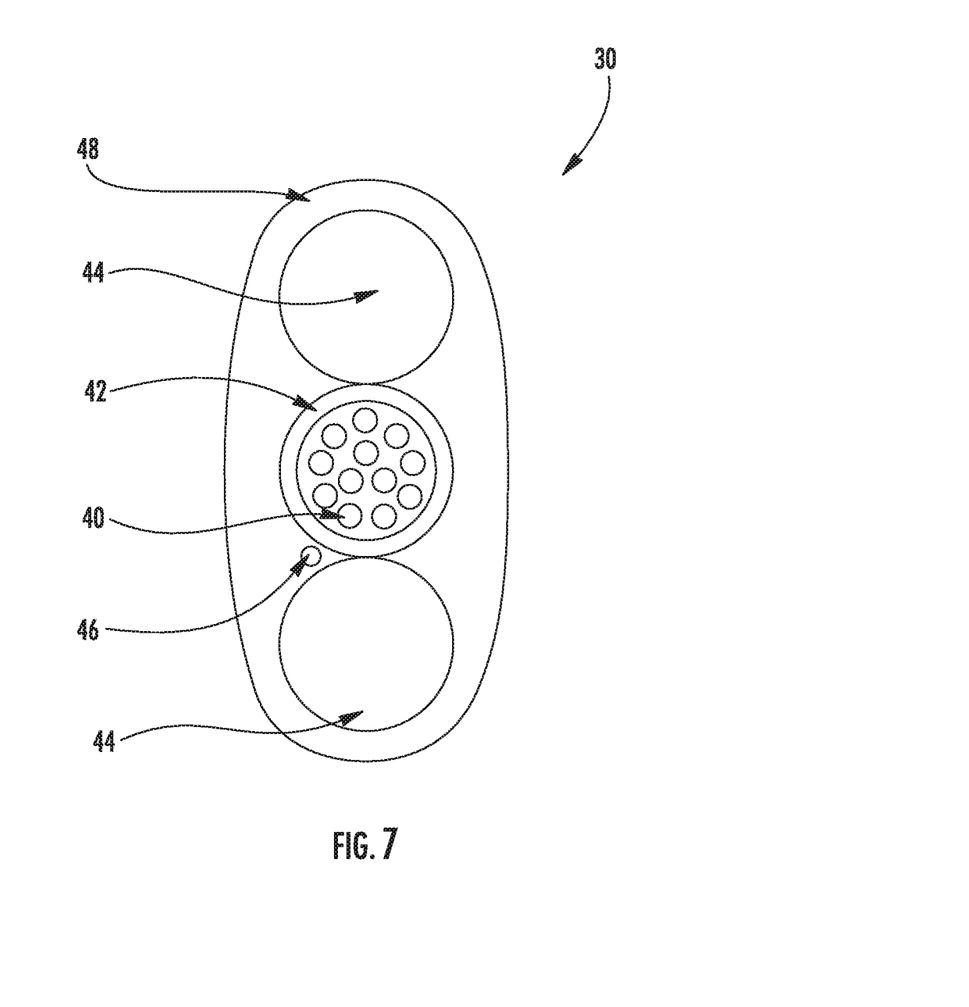
FIG. 7 is a cross-sectional view of a cable in accordance with embodiments of the present disclosure.

Referring now briefly to FIG. 7, a cable 30 in accordance with embodiments of the present disclosure is illustrated. Cable 30 may, in exemplary embodiments, be utilized as a stub cable 24 and/or drop cable 16. As shown, cable 30 may include a plurality of optical fibers 40 disposed within a buffer tube 42. In some embodiments, a gel may be provided in the buffer tube 42 surrounding the optical fibers 40. Cable 30 may further include strength members 44, which in exemplary embodiments may be water blocking dielectric strength members. A water blocking thread 46 may additionally be provided in the cable 30. A jacket 48 may surround the strength members 44, buffer tube 42 and water blocking thread 46. The jacket 48 may, for example, be formed from a UV resistant material. The jacket 48 may include and form an outermost layer and exterior surface of the cable 30. In some embodiments as shown, the 30 generally, and thus the jacket 48 thereof, may have an oval-shaped cross-sectional profile. Accordingly, the cross-sectional profile may have a major radius and a minor radius which are not equal (with the major radius being greater than the minor radius), as opposed to a circular cross-sectional profile which has a constant radius. Such cable 30 may be termed a "flat drop" cable. Alternatively, cable 30 may have a circular cross-sectional profile. It should be understood that the present disclosure is not limited to the above-disclosed flat drop or drop cable embodiments, and rather that the use of any suitable cable 30 is within the scope and spirit of the present disclosure.

Figure 2:
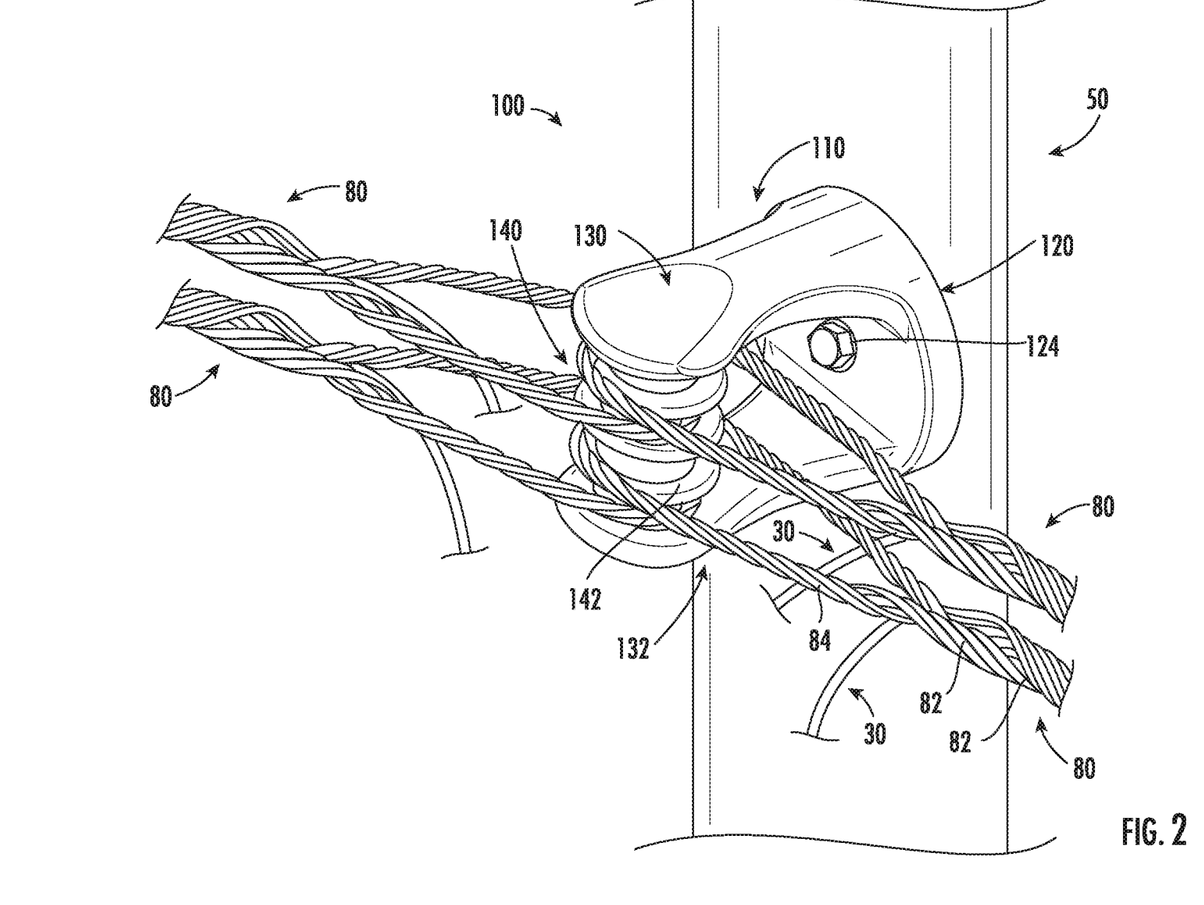
FIG. 2 is a perspective illustration of a cable support assembly supporting multiple drop cables in accordance with embodiments of the present disclosure.

Referring now to FIGS. 2 through 6, embodiments of cable support assemblies 100 and cable support devices 110 in accordance with the present disclosure are provided. Such cable support assemblies 100 and devices 110 in accordance with the present disclosure each advantageously support one or more cables 30, such as flat drop cables, as discussed herein. Notably and as discussed, cable support assemblies 100 and cable support devices 110 may be utilized with stub cables 24 and/or drop cables 16 and/or other suitable cables in network 10, and cables 30 as discussed herein may be utilized as any one or more of these cables. As shown in FIG. 2, a cable support device 110 in accordance with the present disclosure may be mounted to and extend from an above-ground pole 50, which may be a power utility or telephone company owned pole. Advantageously, the cable support device 110 may provide support for multiple cables 30 while requiring only a single attachment to the pole 50, thus significantly reducing the expenses and pole real estate required with supporting the cables 30 on the pole 50. Further, use of cable support devices 110 in accordance with the present disclosure allows for the multiple cables 30 supported thereby to advantageously extend from the cable support device 110 at different angles and directions to each other, thus allowing for significant flexibility in the mounting direction and orientation of the device 110 and in the support of the cables 30 by the device. Still further, use of cable support devices 110 in accordance with the present disclosure advantageously provides improved vibration and wear mitigation relative to known cable support devices, both for individual cables 30 and for the multiple cables 30 utilized collectively with a single cable support device 110.

Figure 6:
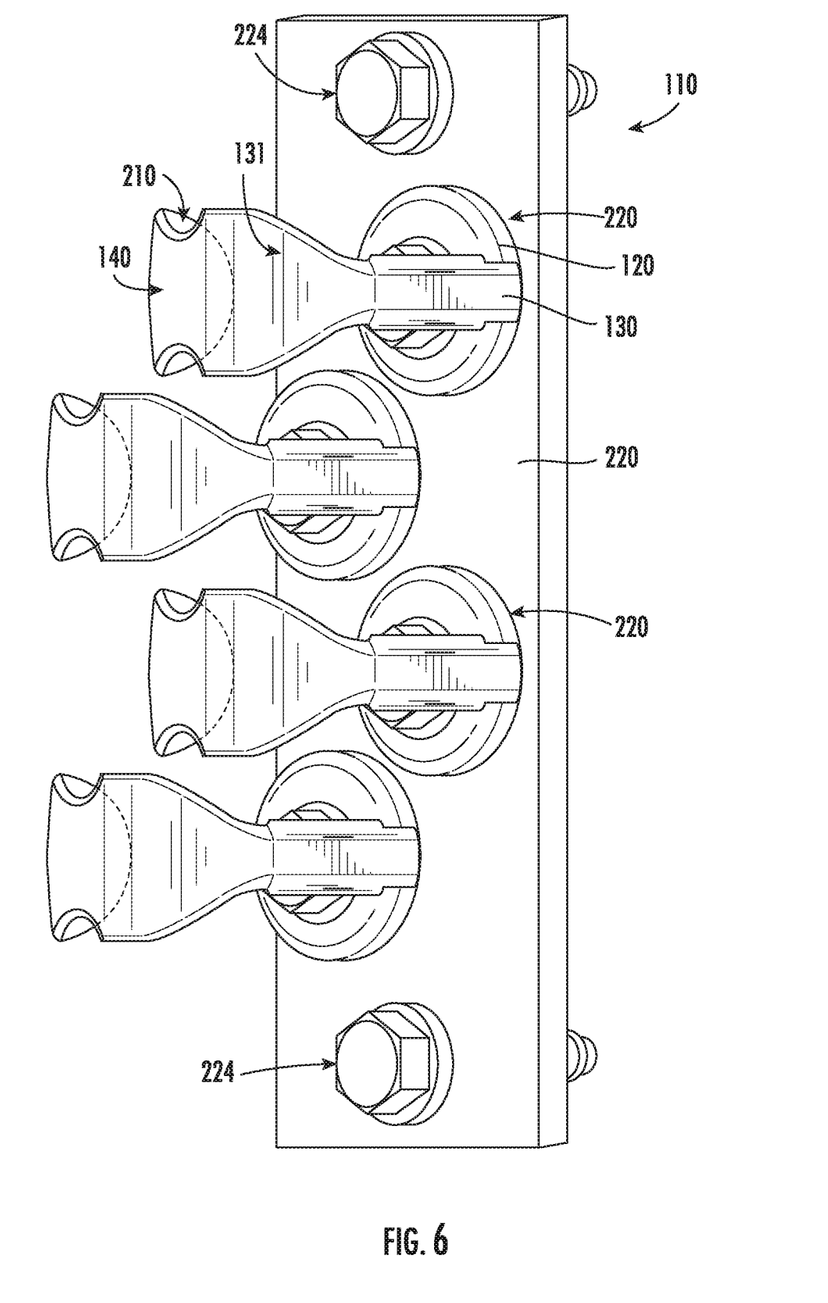
FIG. 6 is a perspective view of another cable support device in accordance with embodiments of the present disclosure.

Referring now to FIGS. 2 and 6, embodiments of cable support assemblies 100 in accordance with the present disclosure are illustrated. Such cable support assemblies 100 advantageously support multiple fiber optic cables 30 on an above-ground pole 50, as shown. A cable support assembly 100 includes a cable support device 110 which is mountable, and may be mounted as shown, on the above-ground pole 50, as discussed herein. Cable support assembly 100 may further include one or more cables 30 which may be supported by the cable support device 110.

Cable support assembly 100 may further include one or more cable deadends 80. Each cable deadend 80 may extend between a cable 30 and a cable support device 110, and may be connected to the cable 30 and cable support device 110 to facilitate the support of the cable 30 by the cable support device 110.

In some embodiments, a cable deadend 80 in accordance with the present disclosure includes end portions 82 which are helically wrapped around a portion of the cable 30. The cable deadend 80 may further include a loop portion 84, which is a continuous intermediate portion of the deadend 80 extending and looped from the end portions 82. The end portions 82 may be wrapped together around the cable 30, and the loop portion 84 may extend from the end portions 82 and the cable 30 and may contact and be connected to the cable support device 110.

Figure 3:
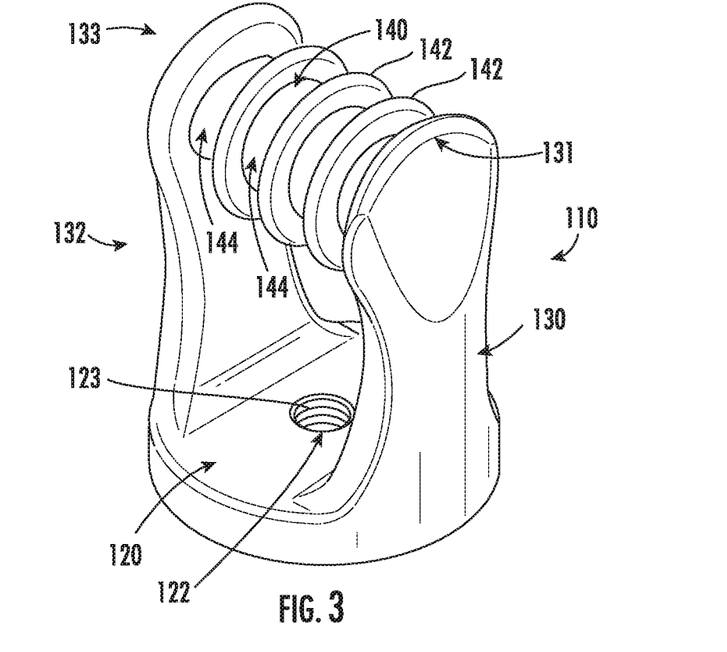
FIG. 3 is a perspective view of a cable support device in accordance with embodiments of the present disclosure.
Figure 4:
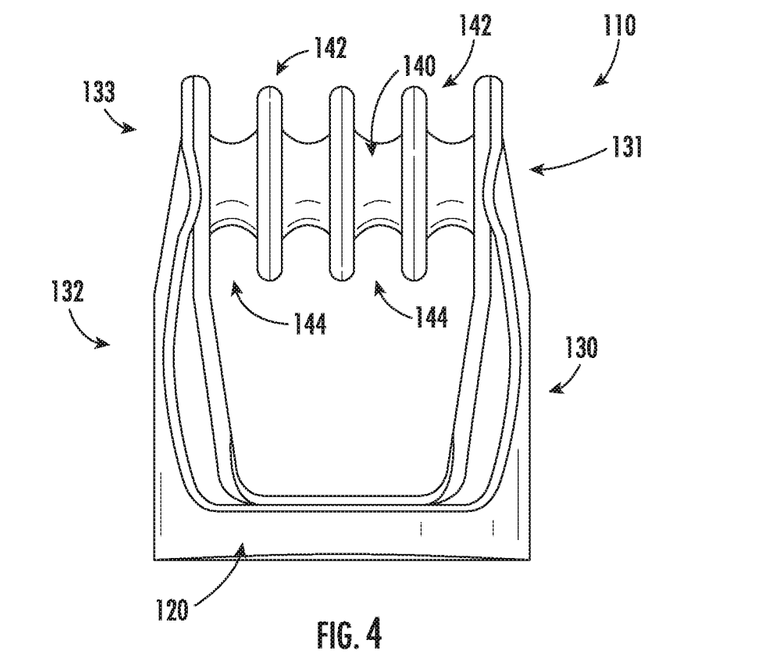
FIG. 4 is a side view of a cable support device in accordance with embodiments of the present disclosure.

Referring now to FIGS. 2 through 4, embodiments of cable support devices 110 in accordance with the present disclosure are provided. A cable support device 110 in accordance with the present disclosure may include a base 120. The base 120 may generally be a flat member. In some embodiments as shown, the base 120 may have a generally cylindrical or truncated conical shape. Alternatively, the base 120 may have another suitable shape such as a cuboid or cube shape.

The base 120 is connectable, and may be connected, to the above-ground pole 50 to facilitate mounting of the cable support device 110 to the above-ground pole 50. For example, a through-hole 122 may be defined in the base 120. The through-hole 122 may, for example, be a central through-hole 122 which is thus defined at a centerpoint of the base 120. A mechanical fastener 124 may be inserted through the through-hole 122, and may further be inserted into the above-ground pole 50, to connect the base 120 to the pole 50 and thus mount the cable support device 110 to the pole 50. Alternatively, a rod of a standoff attachment, such as a standoff bracket, may be inserted through the central through-hole 122, and the standoff attachment may be connected to the pole 50 to mount the cable support device 110 to the pole 50.

In some embodiments, the through-hole 122 may be threaded, such that the base 120 further includes an internal thread 123 disposed in and defining the through-hole 122. In these embodiments, the mechanical fastener 124 may, for example, be a bolt or screw which includes threads that mesh with threads 123. Alternatively, no threads need be included in the base 120.

In other embodiments, no through-hole 122 need be defined in the base 120, and alternative mechanical fasteners may be utilized to connect the base 120 to the pole 50. For example, one or more bands may be wrapped around the base 120 and the pole 50 to connect the base 120 and pole 50 together.

A cable support device 110 in accordance with the present disclosure may further include a first arm 130 and a second arm 132. The first arm 130 and second arm 132 may each extend from the base 120, and may be cantilevered from the base 120 such that each arm 130, 132 extends from the base 120 to a free end 131, 133, respectively, of such arm. In exemplary embodiments, the first arm 130 and the second arm 132 are generally parallel to each other, and extend from the base 120 in a parallel manner.

A cable support device 110 in accordance with the present disclosure may further include a cross-member 140. The cross-member 140 may extend between and be connected to the first arm 130 and the second arm 132, such as at the free ends 131, 133 thereof as shown. The cross-member 140 may include at least one curvilinear surface, which may extend between the first arm 130 and the second arm 132. The curvilinear surface may, for example, face the base 120. In exemplary embodiments, the cross-member 140 is cylindrical. Alternatively, additional planer surfaces other than the at least one curvilinear surface may be included.

A cable support device 110 in accordance with the present disclosure may further include one or more divider members 142. Each divider member 142 may be in contact with and may extend radially outwardly from the cross-member 140. In exemplary embodiments when multiple divider members 142 are utilized, the divider members 142 extend from the cross-member 140 parallel to each other. Further, in exemplary embodiments, the divider members 142 may extend parallel to the first arm 130 and second arm 132. In exemplary embodiments, the divider members 142 are annular members, although in alternative embodiments other suitable shapes may be utilized.

The divider members 142 may be spaced apart from each other, and from the first arm 130 and second arm 132, such as along a longitudinal axis of the cross-member 140. Each divider member 142 may thus define at least two slots 144. The slots 144 defined by a divider member 142 may be located on opposing sides of the divider member 142 (along the longitudinal axis of the cross-member 140). Accordingly, a slot 144 may be defined between neighboring divider members 142, between a divider member 142 and the first arm 130 (e.g. the free end 131 thereof), or between a divider member 142 and the second arm 132 (e.g. the free end 133 thereof) (along the longitudinal axis of the cross-member 140). Each slot 144 may further be defined by the cross-member 140.

As discussed herein, a cable deadend 80, such as the loop portion 84 thereof, contacts and is connected to the cable support device 110 to support a cable 30. For example, each deadend 80, such as the loop portion 84 thereof, may be insertable into one of the slots 144. The deadend 80, such as the loop portion 84 thereof, may thus contact the cross-member 140, such as the curvilinear portion thereof. In exemplary embodiments, each of a plurality of deadends 80 is insertable into one of a plurality of slots 144, such that multiple cables 30 are supported by the cable support device 110.

In exemplary embodiments, the cable support device 110 is a monolithic structure. Such monolithic structure may include the base 120, first arm 130, second arm 132, cross-member 140, and divider members 142. The base 120, first arm 130, second arm 132, cross-member 140, and divider members 142, and in exemplary embodiments the monolithic structure which includes such components, are in exemplary embodiments formed from a metal, such as aluminum, galvanized steel, iron, etc. Such components and/or monolithic structure may in exemplary embodiments be cast or forged.

Figure 5:
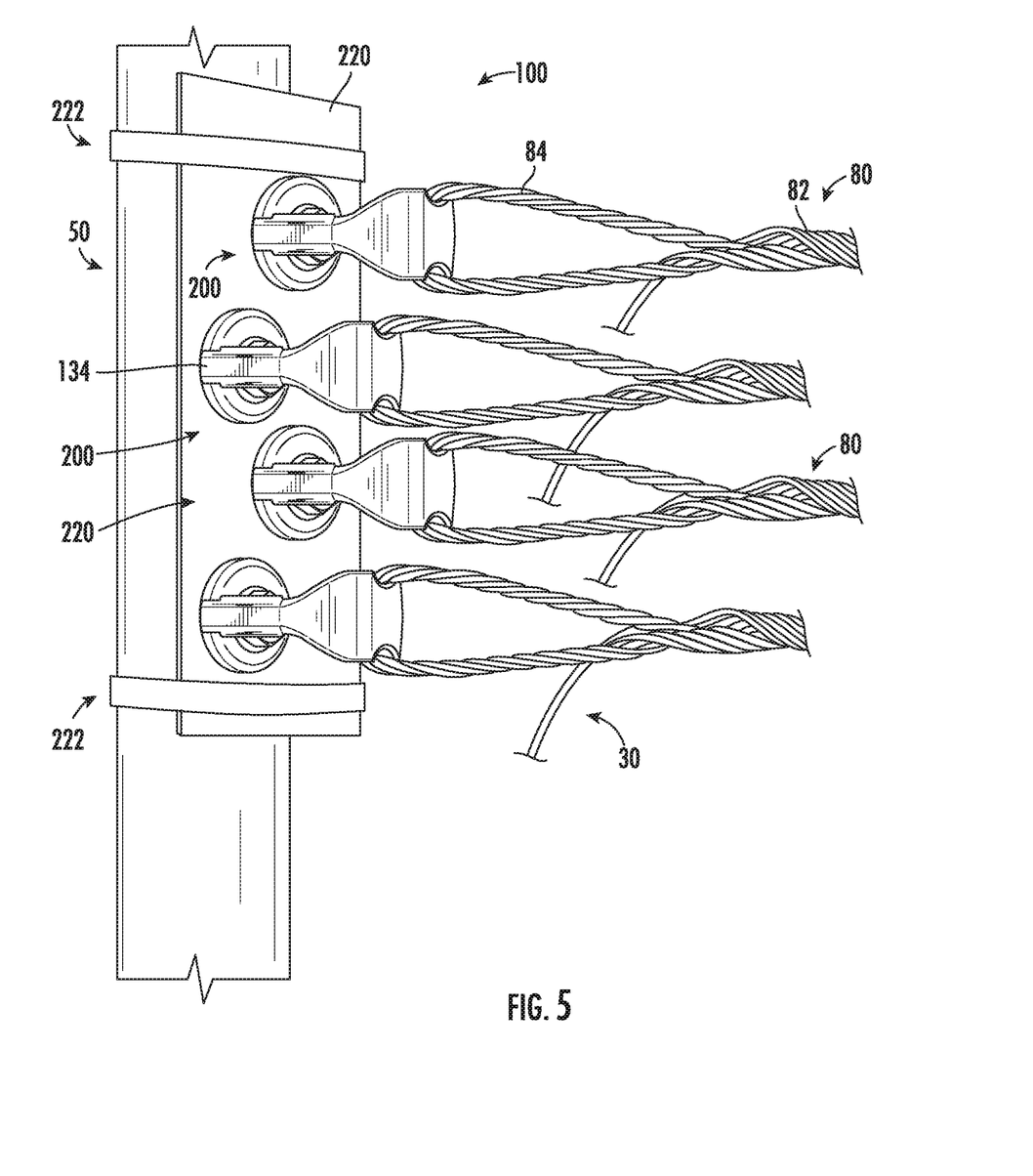
FIG. 5 is a perspective illustration of another cable support assembly supporting multiple drop cables in accordance with embodiments of the present disclosure.

Referring now to FIGS. 5 and 6, alternative embodiments of cable support devices 110 in accordance with the present disclosure are provided. The cable support device 110 may include a plurality of bases 120, a plurality of first arms 130, a plurality of second arms 132, and a plurality of cross-members 140. The cable support device 110 may include a plurality of support units 200, each of which includes a base 120, first arm 130, second arm 132, and cross-member 140. The first arm 130 and second arm 132 may extend from the base 120 as discussed herein and the cross-member 140 may extend between the first arm 130 and the second arm 132 as discussed herein. The cross-member 140 may include a channel 210 which may be arcuate, and the surface of the cross-member 140 defining the channel 210 may be arcuate. No divider members need be utilized.

Cable support devices 110 in accordance with these embodiments may further include a base plate 220 to which each of the plurality of bases 120 is connected, such as via mechanical fasteners 124 (e.g. bolts, screws, bands, etc.). The base plate 220 may in turn be connected to the above-ground pole 50 to mount the cable support device 110 thereto, such as via one or more mechanical fasteners 222 (which in this embodiment are shown as bands).

As discussed herein, a cable deadend 80, such as the loop portion 84 thereof, contacts and is connected to the cable support device 110 to support a cable 30. For example, each deadend 80, such as the loop portion 84 thereof, may be insertable into one of the channels 210. The deadend 80, such as the loop portion 84 thereof, may thus contact the cross-member 140, such as the curvilinear portion thereof. In exemplary embodiments, each of a plurality of deadends 80 is insertable into one of a plurality of channels 210, such that multiple cables 30 are supported by the cable support device 110.

In exemplary embodiments, the cable support device 110 is a monolithic structure. Such monolithic structure may include the bases 120, first arms 130, second arms 132, cross-members 140, and base plate 220. The bases 120, first arms 130, second arms 132, cross-members 140, and base plate 220, and in exemplary embodiments the monolithic structure which includes such components, are in exemplary embodiments formed from a metal, such as aluminum, galvanized steel, iron, etc. Such components and/or monolithic structure may in exemplary embodiments be cast or forged.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A cable support assembly for supporting multiple fiber optic cables on an above-ground pole, the cable support assembly comprising:
    a cable support device comprising:
        a base mountable to the above-ground pole;
        a first arm and a second arm extending from the base, the first arm and second arm generally parallel to each other;
        a cross-member extending between and connected to the first arm and the second arm; and
        at least one divider member extending radially outwardly from the cross-member, the at least one divider member spaced from the first arm and the second arm and defining at least two slots, each of the at least two slots further defined by the cross-member;
        wherein the cable support device is a monolithic structure that includes the base, the first arm, the second arm, the cross-member, and the at least one divider member; and
    a plurality of cable deadends, each of the plurality of deadends insertable into one of the at least two slots.

2. The cable support assembly of claim 1, wherein the monolithic structure is formed from a metal.

3. The cable support assembly of claim 2, wherein the metal is aluminum.

4. The cable support assembly of claim 1, wherein the at least one divider member is a plurality of divider members.

5. The cable support assembly of claim 4, wherein the plurality of divider members extend from the cross-member parallel to each other.

6. The cable support assembly of claim 1, wherein the at least one divider member is annular.

7. The cable support assembly of claim 1, wherein the cross-member is cylindrical.

8. The cable support assembly of claim 1, wherein the base defines a central through-hole.

9. The cable support assembly of claim 8, wherein the base comprises an internal thread disposed in the central through-hole.

10. A cable support device for supporting multiple fiber optic cables on an above-ground pole, the cable support device comprising:
    a base mountable to the above-ground pole;
    a first arm and a second arm extending from the base, the first arm and second arm generally parallel to each other;
    a cross-member extending between and connected to the first arm and the second arm; and at least one divider member extending radially outwardly from the cross-member, the at least one divider member spaced from the first arm and the second arm and defining at least two slots, each of the at least two slots further defined by the cross-member;

wherein the cable support device is a monolithic structure that includes the base, the first arm, the second arm, the cross-member, and the at least one divider member.

11. The cable support device of claim 10, wherein the monolithic structure is formed from a metal.

12. The cable support device of claim 11, wherein the metal is aluminum.

13. The cable support device of claim 10, wherein the at least one divider member is a plurality of divider members.

14. The cable support device of claim 13, wherein the plurality of divider members extend from the cross-member parallel to each other.

15. The cable support device of claim 10, wherein the at least one divider member is annular.

16. The cable support device of claim 10, wherein the cross-member is cylindrical.

17. The cable support device of claim 10, wherein the base defines a central through-hole.

18. The cable support device of claim 17, wherein the base comprises an internal thread disposed in the central through-hole.

* * * * *